(12) United States Patent
Sen et al.

(10) Patent No.: US 11,622,362 B2
(45) Date of Patent: Apr. 4, 2023

(54) PARALLEL SCHEDULER ARCHITECTURE

(71) Applicant: Nokia Technologies Oy, Espoo (FI)

(72) Inventors: Moushumi Sen, Bangalore (IN); Hans Kroener, Geislingen (DE); Suresh Kalyanasundaram, Bangalore (IN); Alois Herzog, Nantes (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 56 days.

(21) Appl. No.: 16/757,901

(22) PCT Filed: Oct. 26, 2017

(86) PCT No.: PCT/EP2017/077441
§ 371 (c)(1),
(2) Date: Apr. 21, 2020

(87) PCT Pub. No.: WO2019/081024
PCT Pub. Date: May 2, 2019

(65) Prior Publication Data
US 2020/0344776 A1    Oct. 29, 2020

(51) Int. Cl.
*H04W 72/12* (2009.01)
*H04B 7/0413* (2017.01)
(Continued)

(52) U.S. Cl.
CPC ...... *H04W 72/1247* (2013.01); *H04B 7/0413* (2013.01); *H04B 7/0695* (2013.01); *H04W 16/28* (2013.01); *H04W 28/08* (2013.01)

(58) Field of Classification Search
CPC . H04W 72/1247; H04W 16/28; H04W 28/08; H04B 7/0413
See application file for complete search history.

(56) References Cited

U.S. PATENT DOCUMENTS

2005/0277444 A1    12/2005   Rensburg et al.
2010/0323712 A1    12/2010   Guey et al.
(Continued)

FOREIGN PATENT DOCUMENTS

CN      102460990 A    5/2012
CN      107005294 A    8/2017
(Continued)

OTHER PUBLICATIONS

International Search Report and Written Opinion received for corresponding Patent Cooperation Treaty Application No. PCT/EP2017/077441, dated Jul. 6, 2018, 15 pages.
(Continued)

*Primary Examiner* — Ricky Q Ngo
*Assistant Examiner* — Stephen N Steiner
(74) *Attorney, Agent, or Firm* — Alston & Bird LLP

(57) ABSTRACT

According to an aspect, there is provided a method for performing in an access node time- and frequency scheduling for a cell comprising two or more subcells. The method comprises the following steps. The access node selects a set of one or more active beams for each of at least two of subcells comprised in the two or more subcells from beams produced by an antenna array of the access node. The access node performs time-scheduling for the cell in common. Finally, the access node performs frequency-scheduling separately and in parallel for each of the at least two subcells for transmission using a corresponding set of one or more active beams.

18 Claims, 12 Drawing Sheets

(51) Int. Cl.
*H04W 16/28* (2009.01)
*H04W 28/08* (2009.01)
*H04B 7/06* (2006.01)

(56) References Cited

U.S. PATENT DOCUMENTS

| | | |
|---|---|---|
| 2012/0052894 A1 | 3/2012 | Manssour et al. |
| 2013/0028093 A1 | 1/2013 | Cho et al. |
| 2013/0235807 A1 | 9/2013 | Lee et al. |
| 2016/0352012 A1* | 12/2016 | Foo .................. H04L 25/03343 |
| 2016/0353467 A1* | 12/2016 | Nekovee .............. H04B 7/0695 |
| 2017/0250747 A1 | 8/2017 | Reinhardt et al. |
| 2019/0124490 A1* | 4/2019 | Wu ........................ H04W 72/12 |
| 2021/0105851 A1* | 4/2021 | Kim ..................... H04L 1/1861 |

FOREIGN PATENT DOCUMENTS

| | | | |
|---|---|---|---|
| WO | 2016/050305 A1 | 4/2016 | |
| WO | WO-2016050305 A1 * | 4/2016 | ........ H04W 72/0446 |
| WO | WO 2017/012803 A1 | 1/2017 | |

OTHER PUBLICATIONS

Office action received for corresponding Indian Patent Application No. 202047020889, dated Jun. 26, 2021, 7 pages.
Office Action for Chinese Patent Application No. 201780096299.7 dated Aug. 17, 2021, 17 pages.
Office Action for Chinese Application No. 201780096299.7 dated Feb. 25, 2022, 20 pages.
Office Action for European Application No. 17797551.3 dated Jul. 13, 2022, 9 pages.

\* cited by examiner

PARALLEL SCHEDULER ARCHITECTURE

RELATED APPLICATION

This application claims priority to PCT Application No. PCT/EP2017/077441, filed on Oct. 26, 2017, each of which is incorporated herein by reference in its entirety.

TECHNICAL FIELD

The invention relates to communications.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

The number of networking devices is increasing rapidly, and future cellular communication systems need to have capability of handling vast numbers of connecting terminal devices. One solution for providing the required capability is to use multi-user multiple-input multiple-output (MU-MIMO) technology. In MU-MIMO, the capacity of a radio link is increased due to the use multiple transmit and receive antennas which enables the exploitation of multipath propagation.

While the use of MU-MIMO enables through multipath propagation the co-scheduling of multiple users on the same time-frequency resource leading to an increase in capacity, the requirements for the scheduling in such a system may be very high as a consequence. Therefore, a solution is needed for providing more efficient scheduling to be able to utilize MU-MIMO to its fullest extent.

BRIEF DESCRIPTION

According to an aspect, there is provided a method for performing in an access node time- and frequency scheduling for a cell comprising two or more subcells, the method comprising: selecting a set of one or more active beams for each of at least two subcells comprised in the two or more subcells from beams produced by an antenna array of the access node, performing time-scheduling for the cell in common and performing frequency-scheduling separately and in parallel for each of the at least two subcells for transmission using a corresponding set of one or more active beams. Embodiments are defined in the dependent claims.

According to an aspect, there is provided an apparatus comprising: at least one processor, and at least one memory comprising a computer program code, wherein the at least one processor, the memory, and the computer program code are configured to cause the apparatus to perform the above method.

According to an aspect, there is provided an apparatus comprising means for carrying out the above method.

According to an aspect, there is provided a non-transitory computer readable media having stored thereon instructions that, when executed by a computing device, cause the computing device to perform the above method.

According to an aspect, there is provided a computer program product comprising instructions which, when the program is executed by a computer, cause the computer to carry out the above method.

One or more examples of implementations are set forth in more detail in the accompanying drawings and the description below. Other features will be apparent from the description and drawings, and from the claims.

BRIEF DESCRIPTION OF DRAWINGS

In the following, exemplary embodiments will be described with reference to the attached drawings, in which.

DETAILED DESCRIPTION OF SOME EMBODIMENTS

Figure 1:
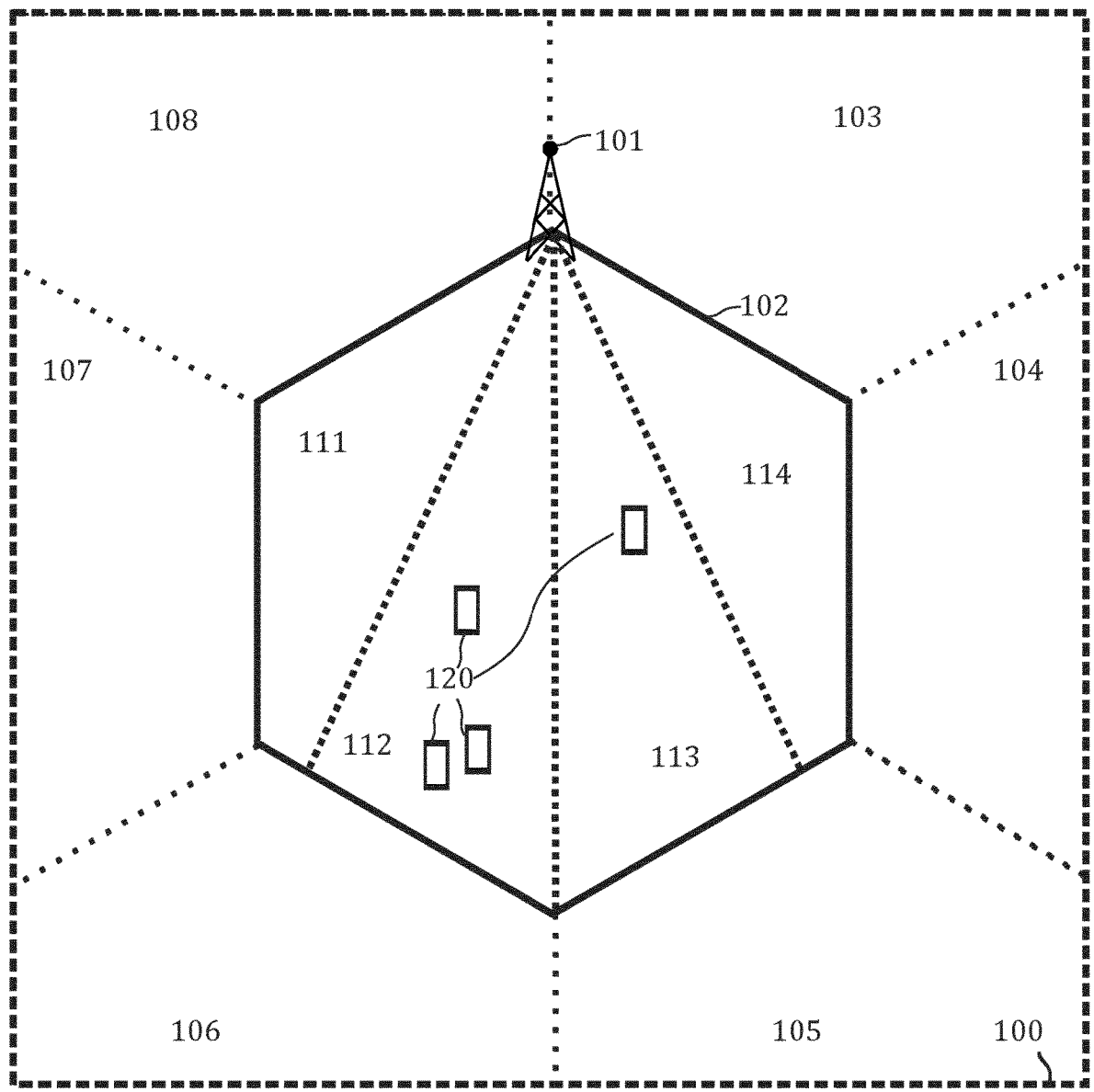
FIG. 1 illustrates an example of a communications system.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments described may be implemented in a radio system, such as in at least one of the following: Worldwide Interoperability for Microwave Access (WiMAX), Global System for Mobile communications (GSM, 2G), GSM EDGE radio access Network (GERAN), General Packet Radio Service (GRPS), Universal Mobile Telecommunications System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G), and beyond, mobile or cellular communication system.

The embodiments are not, however, restricted to the system given as an example but a person skilled in the art may apply the solution to other communication systems provided with necessary properties. One example of a suitable communications system is the 5G system, as listed above. 5G has been envisaged to use multiple-input and multiple-output (MIMO) multi-antenna transmission techniques, more base stations or nodes than the current network deployments of LTE, by using a so-called small cell concept including macro sites operating in co-operation with smaller local area access nodes and perhaps also employing a variety of radio technologies for better coverage and enhanced data rates. 5G will likely be comprised of more than one radio access technology (RAT), each optimized for certain use cases and/or spectrum. 5G system may also incorporate both cellular (3GPP) and non-cellular (for example IEEE) technologies. 5G mobile communications will have a wider range of use cases and related applications including video streaming, augmented reality, different ways of data sharing and various forms of machine type applications, including vehicular safety, different sensors and realtime control. 5G is expected to have multiple radio interfaces, including apart from earlier deployed frequencies below 6 GHz, also higher, that is cmWave and mmWave frequencies, and also being capable of integrating with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as inter-RI operability between cmWave and mmWave). One of the concepts considered to be used in 5G networks is network slicing in which multiple independent and dedicated virtual sub networks (network instances) may be created within the same infrastructure to run services that have different requirements on latency, reliability, throughput and mobility.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise, in addition to standard high-volume servers, switches and storage devices, one or more virtual machines running computer program codes using standard or general type servers instead of customized hardware. Cloud computing or cloud data storage may also be utilized. In radio communications, this may mean that node operations are carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

FIG. 1 illustrates an example of a communication system 100 to which embodiments of the invention may be applied. The system 100 may be a wireless communication system comprising at least an access node 101 (equally called a base station) providing and managing a respective cell 102. From another point of view, the cell 102 may define a coverage area or a service area of the access node 101. The cell 102 of the access node 101 may be divided into two or more subcells 111, 112, 113, 114. The cell 102 may have one or more neighboring cells 103, 104, 105, 106, 107 associated with other access nodes (not shown in FIG. 1). In the following, the embodiments of the invention are discussed for the access node 101 and the corresponding cell 102.

The cell 102 may be a small cell (a micro, femto, or a pico cell) or a macro cell. For example, the access node 101 may be an evolved Node B (eNB) as in the LTE and LTE-A, a next generation node B (gNB), like in 5G, an access point of an IEEE 802.11-based network (Wi-Fi or wireless local area network, WLAN), a radio network controller (RNC) as in the UMTS, a base station controller (BSC) as in the GSM/GERAN, Access Point (AP), or any other apparatus capable of controlling wireless communication and managing wireless resources within a cell. Typically the wireless communication is radio communication. For 5G solutions, the implementation may be similar to LTE-A, as described above.

The subcells 111, 112, 113, 114 of the cell 102 may constitute a contiguous region in azimuth and/or elevation dimensions with the access node 101 acting as the origin. Moreover, the coverage area of the subcells together may provide coverage of the entire cell. It should be appreciated that the subcells illustrated in FIG. 1 are mere examples of how the subcells may be defined. The shape and the number of the subcells may be different in other embodiments of the invention. The cell 102 may be divided into subcells 111, 112, 13, 114 based on the properties of the antenna(s) of the access node 102 capable of producing multiple beams as well as on the "loads" induced to different regions of the cell 102 by the terminal devices 120 as will be described in detail later.

The access node 101 may provide one or more terminal devices (user equipment, UEs) 120 within the cell 102 with wireless access to other networks such as the Internet, either directly or via a core network. The terminal device 120 may refer to a portable computing device (equipment, apparatus), and it may also be referred to as a user device, a user terminal or a mobile terminal or a machinetype-communication (MTC) device, also called Machine-to-Machine device and peer-to-peer device. Such computing devices (apparatuses) include wireless mobile communication devices operating with or without a subscriber identification module (SIM) in hardware or in software, including, but not limited to, the following types of devices: mobile phone, smart-phone, personal digital assistant (PDA), handset, laptop and/or touch screen computer, e-reading device, tablet, game console, notebook, multimedia device, sensor, actuator, video camera, car, wearable computer, telemetry appliances, and telemonitoring appliances.

The access node 101 as well as some or all of the terminal devices 120 may be configured for multiple-input multiple-output (MIMO) operation. MIMO is a communications technique in which a plurality of antennas are used in the transmitter and the receiver in order to take advantage of multipath propagation. While conventionally multipath components (non-line-of-sight signal components arriving to the receiver via, for example, reflections) in a radio channel are considered a negative phenomenon due to the interference they cause for the line-of-sight path, in MIMO techniques the multipath components are utilized for sending and receiving more than one data signal (more than one stream) simultaneously over the same radio channel leading to an increase in channel capacity, i.e., the upper limit on the achievable rate at which information can be reliably transmitted over the communications channel. This may be achieved using multi-stream beamforming, or other spatial processing in the transmitter if channel state information (CSI) is available for the radio channel or using spatial multiplexing if CSI is not available for the radio channel. MIMO techniques may alternatively be used to enhance signal diversity of a single data signal through diversity coding. The access node 101 and some or all of the terminal devices 120 may be configured specifically to use multi-user-MIMO (MU-MIMO) such that the access node 101 is able to communicate using MIMO with a plurality of MIMO-enabled terminal devices 120 simultaneously.

The plurality of antennas used in the MIMO transmitter and the MIMO receiver may form a one-dimensional array (if antenna elements are arranged along the same line) or a two-dimensional antenna array (if the antenna elements are arranged on the same plane but not along the same line). In MIMO, multibeam beamforming techniques may be used to apply different phase shifts and/or amplification/attenuation to signals fed to the plurality of antennas in the transmitter and to signals received by the plurality of antennas in the receiver so as to create different multi-beam transmitting and receiving antenna patterns (radiation patterns). This way the transmitter may transmit a signal only to specific direction or directions and the receiver may be configured to be pick up only said signal by applying spatial selectivity (that is, efficient reception only from certain elevation and/or azimuth angles).

Figure 2:
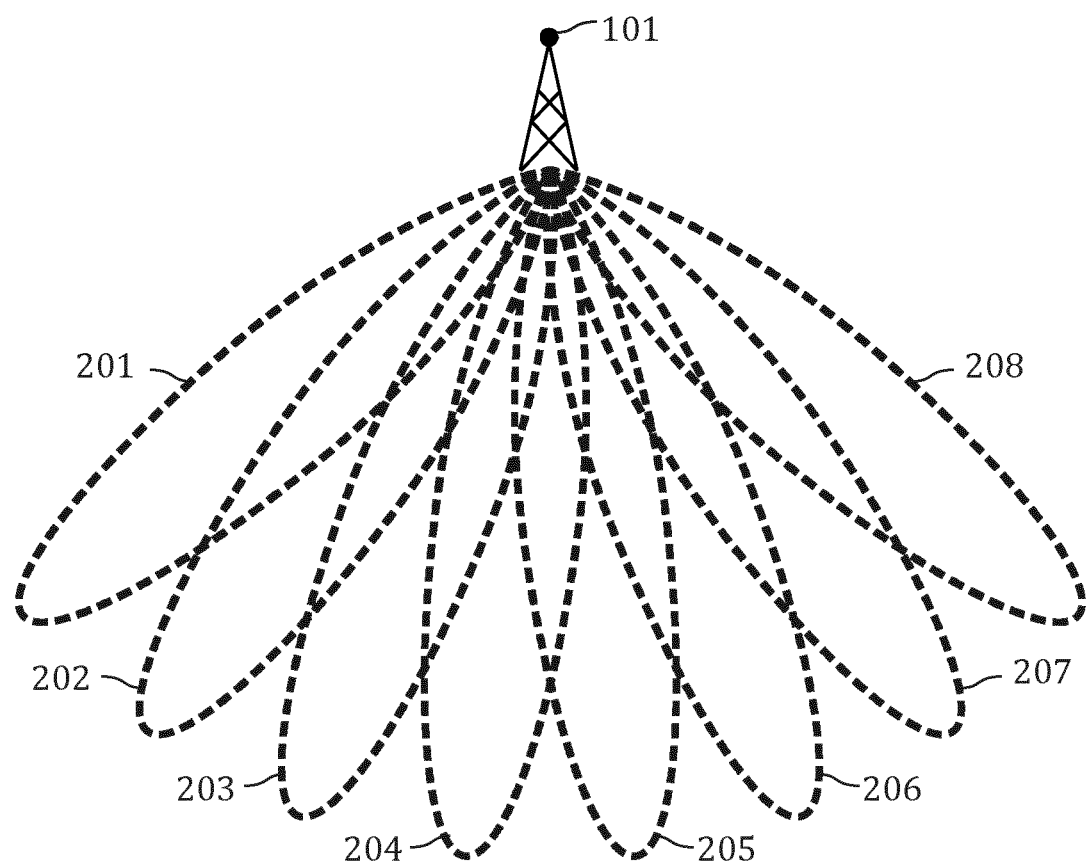
FIG. 2 illustrates an example of beams producible by an access node.

FIG. 2 illustrates the access node 101 as illustrated also in FIG. 1 and the beams 201, 202, 203, 204, 205, 206, 207, 208 producible by its MIMO antenna array. Specifically, FIG. 2 illustrates the azimuthal radiation patterns (with a constant elevation angle value) for the beams of the MIMO antenna array. It should be appreciated that though FIG. 2 as well as following FIGS. 7 to 10 illustrate only beams separated by azimuth angles, similar set of beams may be defined in the elevation angle for each of the beams 201, 202, 203, 204, 205, 206, 207, 208 if the MIMO antenna array is a two-dimensional antenna array. In some cases, a one-dimensional array producing beams only separated by elevation angles may be used. In all the mentioned scenarios, the different beams are produced by applying different complex weights to each of the antenna elements (i.e., changing the phase and amplitude of the signals fed to antenna elements) in the MIMO antenna arrays as described in the previous paragraph. The set of beams 201, 202, 203, 204, 205, 206, 207, 208 may be called Grid of Beams (GoB).

FIG. 2 illustrates the access node 101 in the same orientation as also illustrated in FIG. 1. Therefore, it is clear that a specific subcell may be best served with a certain subset of Grid of Beams, namely a subset of beams that are adjacent to each other in the azimuth and/or elevation angle. Each of said subsets may comprise one or more beams. The number of said one or more beams for each subcell may depend not only on the physical orientation of the beams and definitions of the subcells but also dynamically on the number of terminal devices and their distribution within the cell. In embodiments of the invention, the mapping between beams and subcells within each cell may be arranged so as to provide a balanced load across subcells based on channel measurements provided by the terminal devices as will be described in detail in relation to FIG. 5.

Figure 3:
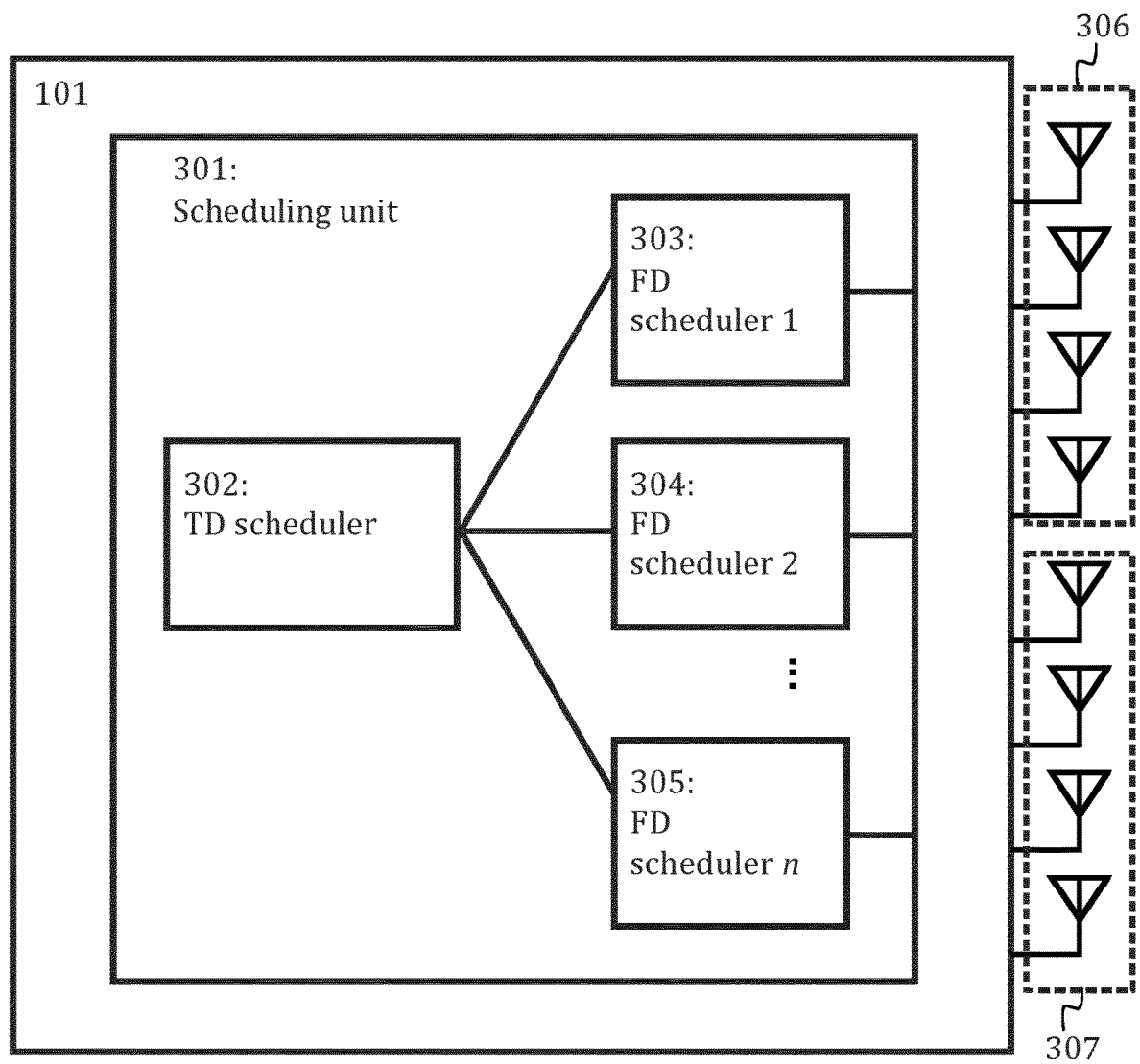
FIG. 3 illustrates high-level architecture of an exemplary access node.

FIG. 3 illustrates a simplified high-level architecture of the access node according to embodiments of the invention. The access node 101 comprises at least a scheduling unit 301 providing time- and frequency scheduling, a receiving MIMO antenna array 306 and a transmitting MIMO antenna array 307. The access node 101 may further comprise one or more digital or analog units as commonly found in MIMO-enabled transceivers, for example, an RF front-end and a digital MIMO processing unit for performing a number of MIMO-related tasks such as channel estimation, MIMO detection, precoding and/or spatial multiplexing.

The MIMO antenna arrays 306, 307 may be, as described earlier, one-dimensional or two-dimensional antenna arrays capable of producing a set of beams separated by azimuth and/or elevation angles. The individual antenna elements of the MIMO antenna arrays 306, 307 may be, for example, dipole antennas, monopole antennas or microstrip antennas such as patch antennas.

The scheduling unit 301 further comprises a common time-domain (TD) scheduler 302 providing time-scheduling using at least one core of the TD scheduler 302 and two or more parallel frequency-domain (FD) schedulers 303, 304, 305 allowing for independent frequency-scheduling operations in each core of each FD scheduler 303, 304, 305. A core may be equivalently called a processor core, a processing unit or a central processing unit (CPU). In some embodiments, the number of the two or more FD schedulers 303, 304, 305 may be equal to the number of subcells in the cell defined by the access node 101 so that each FD scheduler 303, 304, 305 may be responsible for the frequency-scheduling of one subcell. The illustrated architecture with a common TD scheduler 302 and parallel FD schedulers 303, 304, 305 provides a significant reduction in scheduler complexity compared to the complexity of monolithic single schedulers. The benefits are especially notable when large bandwidths (e.g., up to 100 MHz) are considered and in view of the large number of co-scheduled users that is expected to be the norm in future 5G systems.

The scheduling unit 301 may be configured to perform using the TD scheduler 302 and/or FD schedulers 303, 304, 305 or other subunits, in addition to the time- and frequency-scheduling, also other tasks related to the scheduling such as load balancing. In some embodiments, the TD scheduler 302 is configured to perform periodical load balancing for the cell based on a first timer. The frequency with which the load balancing is performed according to the first timer may depend on the spatial and/or temporal variability of traffic, for example, so that the increase in the variability in the traffic leads to more frequent load balancing (i.e., reduced period for the first timer).

In order to provide reliable transmission of data from the access node 101 to the terminal devices, the different data streams for transmitting to different terminal devices should be orthogonal to each other. If this is not the case, the different data streams may interfere with each other resulting in distortion of the signal and consequently loss of data. As the TD scheduler 302 performs the time-scheduling commonly for the whole cell and the FD schedulers 303, 304, 305 perform frequency-scheduling in parallel, independent of each other for each subcell, the same time-frequency resource may be scheduled for two or more terminal devices located in two or more different subcells at the same time. Orthogonality based on frequency and time domains is therefore not guaranteed.

To solve the aforementioned orthogonality issue, the scheduling unit 301 may be configured to perform scheduling only for some of the beams provided by the MIMO antenna array 305 for each subcell so that the beams potentially corresponding to the same time-frequency resource block are substantially spatially orthogonal, at least for certain terminal devices, for example, having sufficiently high scheduling priority. Here and in the following, two beams are considered spatially orthogonal to each other if the angle between the corresponding directional vectors (or equally the wave vectors) is greater than a pre-determined threshold value. Said pre-determined threshold value may be determined, for example, by requiring the interference power of each beam in the direction of the other beam to be lower than a threshold power value. As some subcells may not be covered by any of the active beams (i.e., scheduled beams), some of the terminal devices in the cell may not be scheduled. The discussed spatial orthogonality-based pruning of beams may be implemented in the TD scheduler 302 and/or in a separate subunit of the scheduling unit 301. How it is determined which beams are scheduled is discussed in detail in relation to FIGS. 6 and 11.

In some embodiments where the number of FD schedulers 303, 304, 305 (or specifically FD scheduler cores) is greater than the number of transceiver units in the access node 101, the TD scheduler 302 may be configured to allocate orthogonal frequency resources to two or more FD schedulers 303, 304, 305.

In an embodiment of the invention, TD scheduler 302 comprising load balancing and spatial orthogonality-based pruning of beams functionalities may provide each FD scheduler a subset of terminal devices to be frequency-scheduled, a subset of beams to be frequency-scheduled, number of terminal devices which may be co-scheduled and a set of resources, e.g., physical resource blocks (PRBs), to be frequency-scheduled. The FD schedulers 303, 304, 305 may provide as an output for the scheduling unit 301 the scheduled terminal devices and the resource allocation of said terminal devices.

Figure 4:
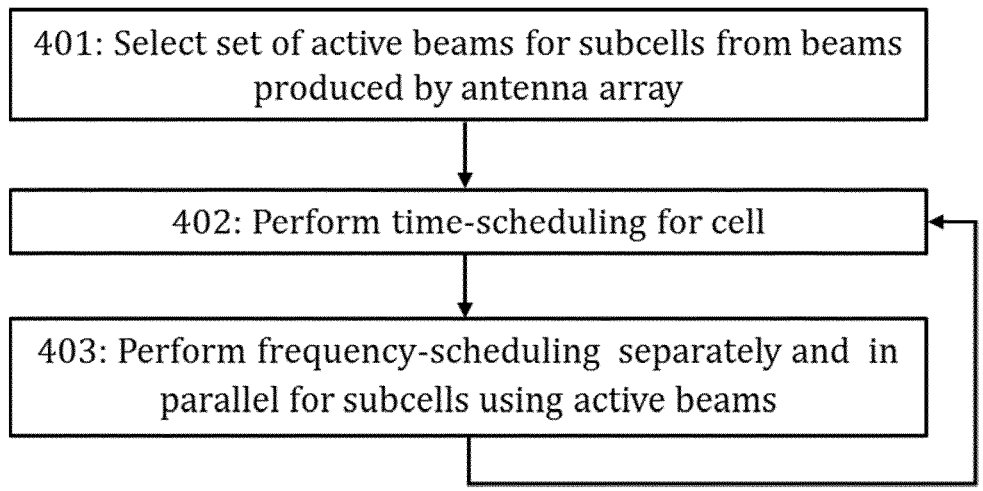
FIGS. 4 to 6 illustrate examples of processes.

FIG. 4 illustrates an exemplary process for performing time- and frequency scheduling for a cell comprising two or more subcells. The illustrated process may be performed by an access node providing a cell or by the scheduling unit. Here and in the following exemplary processes, the steps of the processes are described by considering the access node as the entity performing the steps for simplicity.

Referring to FIG. 4, the access node selects, in block 401, a set of one or more active beams for each of at least two of subcells comprised in the two or more subcells from beams produced by an antenna array of the access node. The number of the at least two subcells may be equal to or smaller than the number of the two or more subcells, that is, all or some of the beams producible by the antenna may be used for transmission. The selection may be based on spatial orthogonality considerations as discussed previously. The access node may be configured for multiple-input and multiple-output, MIMO, operation and the antenna array may be a MIMO antenna array. Then, the access node performs, in block 402, time-scheduling for the cell in common. In other words, the same time-scheduling is performed for all of the at least two subcells by the same TD scheduler. Finally, the access node performs, in block 403, frequency-scheduling separately and in parallel for each of the at least two subcells for transmission using a corresponding set of one or more active beams. The frequency-scheduling may be performed at least two FD schedulers so that each FD scheduler performs the frequency-scheduling for a single subcell of the at least two subcells. The time- and frequency-scheduling steps 402, 403 may correspond to scheduling for a single time resource unit and therefore need to be repeated periodically. The time resource unit may be Transmission Time Interval (TTI). The TTI defined the amount of time required to transmit one block of data on the radio link. Specifically, the TTI is related to the size of the data blocks passed from the higher network layers to the radio link layer.

In some embodiments, at least one subcell may be selected, instead of at least two subcells. Selecting a single subcell may be feasible, for example, in a scenario where the cell comprises only two subcells one of which becomes suddenly highly populated with terminal devices while the other remains simultaneously almost empty. Obviously, in such a case no parallel processing may be employed, at least in the manner illustrated in FIG. 4.

Figure 5:
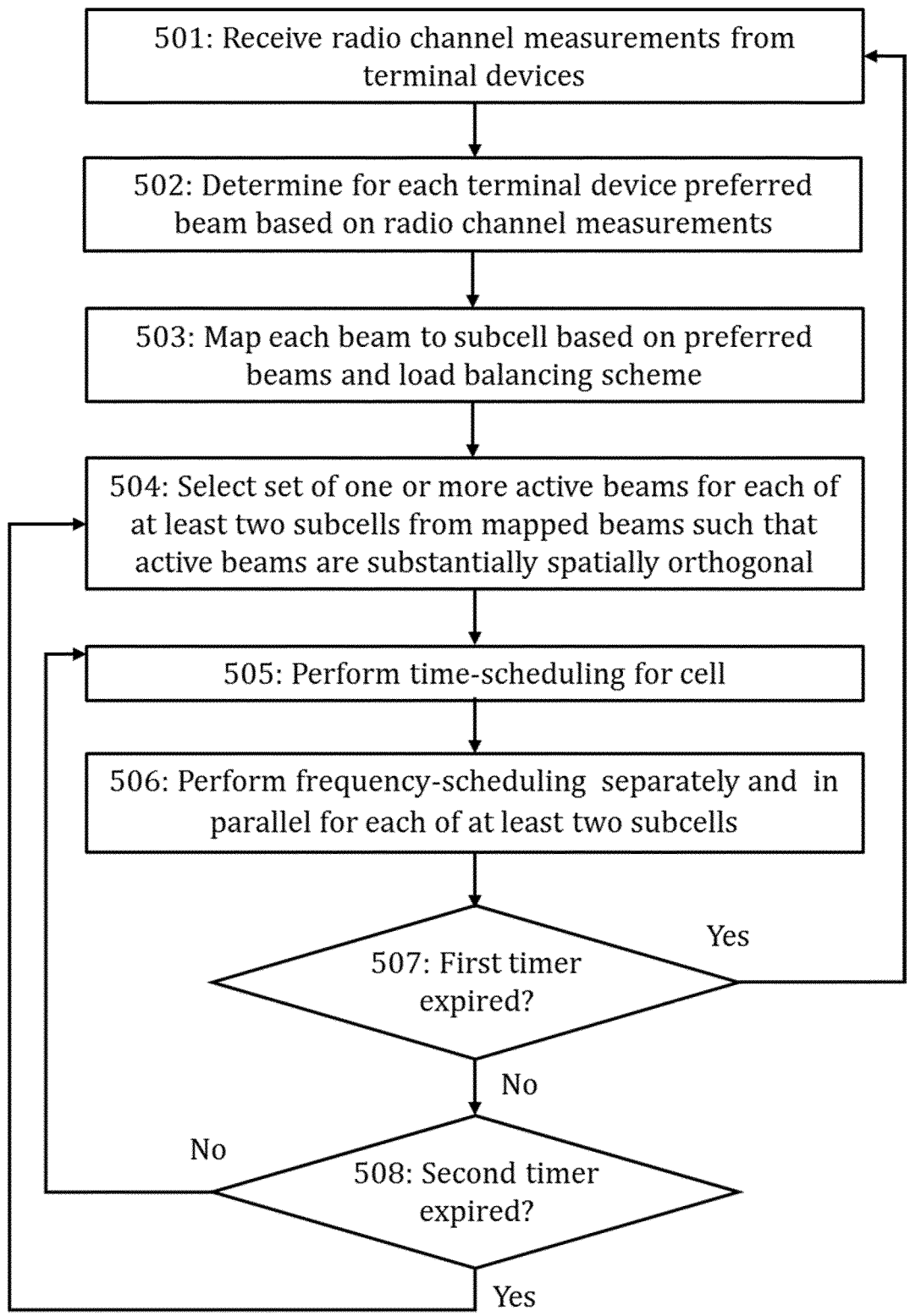

FIG. 5 illustrates a more involved exemplary process for performing time- and frequency scheduling for a cell comprising two or more subcells. Similar to FIG. 4, the illustrated process may be performed by an access node providing a cell or by the scheduling unit.

In FIG. 5, the access node receives, in block 501, radio channel measurements from terminal devices within the cell. Each terminal device may be configured to report periodically channel measurement results from multiple beams of the antenna array to the access node. The access node determines, in block 502, for each terminal device in the cell a preferred beam from the beams produced by the antenna array based on the radio channel measurements. The preferred beam may be the beam which provides the best channel quality for that terminal device at that time. The channel quality for the terminal device may be evaluated by calculating a metric for channel quality, for example, Channel Quality Indicator (CQI) as defined in LTE. Each beam may be reported as the preferred beam by one or more terminal devices or none of the terminal devices. Based on the preferred beams of the terminal devices in different subcells as well as on a load balancing scheme, the access node maps, in block 503, each of the beams produced by the antenna array to one of the subcells. Each subcell may have one or more beams mapped to it. The beams mapped to each subcell may be adjacent to each other in the azimuth and/or elevation directions. The load balancing scheme used for the mapping may be based on calculating loads of the beams and/or subcells. The number of terminal devices that need to be served by a single beam may be considered as an indicator for a load of that beam while the load of a subcell may be defined as a sum of the loads of the beams corresponding to the subcell. By defining the subcells (or equally subsets of beams mapped to the subcells) so that loads of subcells are balanced (substantially equal), the frequency resources of the parallel FD schedulers may be utilized efficiently.

In some embodiments, each terminal device associated with the cell may be configured to periodically determine based on their own radio channel measurements and report back to the access node its preferred beam directly. In such a case, the access node may simply gather the results on the preferred beams together and use them for the mapping (effectively omitting step 502).

In some embodiments, the load metric of a subcell may be defined as a maximum of the proportional fairness (PF) metrics of terminal devices in the subcell. The proportional fairness metric may be calculated using a proportional fairness algorithm based upon maintaining a balance between two competing interests: trying to maximize total throughput while at the same time allowing all terminal devices at least a minimal level of service (i.e., retaining fairness among terminal devices). Such load balancing may be achieved by assigning each data flow roughly equal resources in the long term.

In other embodiments, the load metric of a subcell may be a maximum value of scheduling priority metrics of the terminal devices (scheduling priority metric as defined in the following paragraph), a metric for the amount of remaining resources after meeting the needs of the guaranteed bitrate (GBR) terminal devices or a metric for the amount of available resources per non-GBR (i.e., best effort terminal device) after subtracting the resources given out to GBR terminal devices. The guaranteed bit rate may be defined as a minimum bit rate requested by an application.

Once the mapping between the beams and the subcells is resolved, the access node selects, in block 504, a set of one or more active beams for each of the at least two subcells from mapped beams of a corresponding subcell. Specifically, the selection may be performed such that all beams comprised in selected sets of one or more active beams are substantially spatially orthogonal at least for terminal devices with highest scheduling priority in each of the at least two subcells. The highest scheduling priority may be evaluated based on a scheduling priority metric defined, for example, as a PF metric (as defined earlier), a guaranteed bit rate (GBR), a time-to-live (TTL), a head-of-line (HoL) packet delay, a Quality of Service (QoS)-related metric, a guaranteed throughput metric, a delay metric or any corresponding metric. The scheduling priority metric may also be defined as any combination of the aforementioned metrics. The time-to-live is the lifetime of a data packet and the HoL packet delay is the waiting time between the packet arrival time and the time the packet is transmitted successfully. In some embodiments, the selection in block 504 may be performed for at least one subcell so that in some specific scenarios only a single subcell may be scheduled to ensure orthogonality.

While blocks 505 and 506 are similar to blocks 402 and 403 of FIG. 4 and therefore not repeated here for brevity, the blocks 507 and 508 provide functionalities which have not yet been discussed. It is assumed that there are two timers pre-defined in the access node: a first timer and a second timer. The first timer may preferably have longer period than the second timer. First, the access node checks, in block 507, whether the first timer has expired. If this is the case, the whole process, that is, blocks 501 to 507 are repeated. If this is not the case, the access node checks, in block 508, whether the second timer has expired. If the second timer has expired, only blocks 504 to 508 are repeated. In other words, the first timer is used to redo the load balancing and thus to update the mapping between the beams and the subcells which are assumed to change relatively slowly in time (depending on the spatial and temporal variability of traffic). The second timer, on the other hand, is used for faster-time scale switching between different beams of the antenna array being active. In some embodiments, the second timer may be omitted and new active beams may be selected every time the time- and frequency scheduling is performed (e.g., once every TTI).

Figure 6:
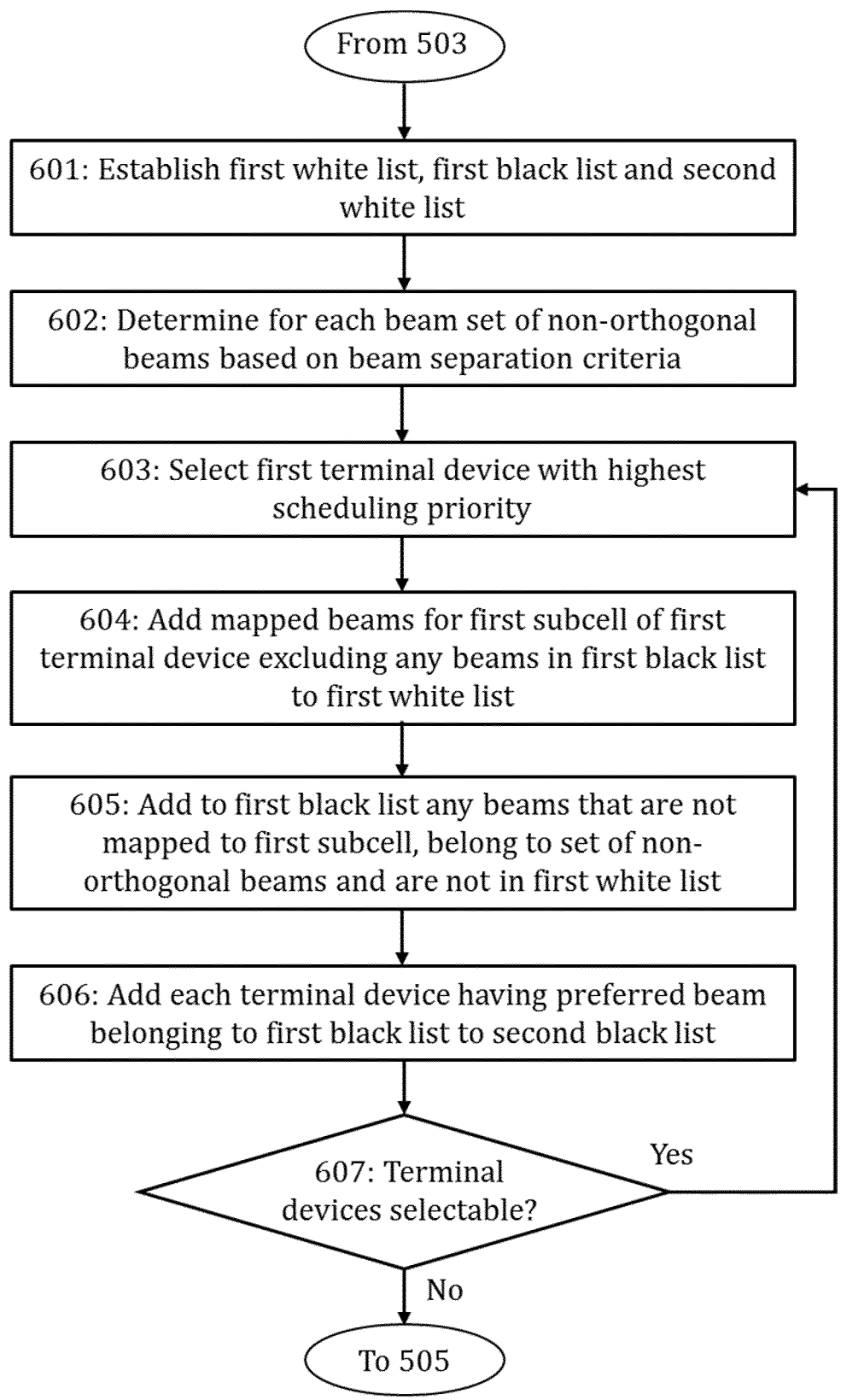

FIG. 6 illustrates an example of a process which may be used, in block 504 of FIG. 5, for selecting the one or more active beams for each of the at least two subcells so that all beams comprised in selected sets are substantially spatially orthogonal at least for terminal devices with highest scheduling priority in each of the at least two subcells.

After the mapping has been completed in block 503 of FIG. 5, the access node, first establishes, in block 601, at least three different lists: a first white list, a second white list and a first black list. The first white list is for sets of one or more active beams for the at least two subcells, that is, for the active beams to be selected. The first black list is for beams produced by the antenna array to be excluded from transmission. Finally, the second black list is for terminal devices which are excluded from the scheduling. In some embodiments, a second black list for terminal devices approved for scheduling may also be established (and updated accordingly during the process). All of the lists are initially empty.

The access node determines, in block 602, for each beam of the antenna array a set of non-orthogonal beams based on beam separation criteria in azimuth and/or elevation directions. The beam separation criteria may comprise, for example, a threshold value for angular separation of the beam directions in azimuth and/or elevation directions. The beam separation criteria may also take into account the beamwidths of the beams, for example, so that the threshold value is defined for angular separation between nearest half power (−3 dB) points of the beams in azimuth and/or elevation directions. The beam separation criteria (i.e., a threshold value) may also be defined based on the amount of interference a beam causes to other beams in terms of beamforming gain taking into account sidelobes of the beam. A beam is considered non-orthogonal to another beam if the defined one or more threshold values for the angular separation and/or the amount of interference is exceeded. Alternatively, the access node may retrieve said information on non-orthogonality of beams from a memory if said information has been stored there previously. The access node selects, in block 603, a first terminal device with the highest scheduling priority from the terminal devices excluding terminal devices having a preferred beam in the first white list and terminal devices in the second black list. Obviously, in this initial round of iterations, no terminal devices are excluded from said selection. The access node adds, in block 604, all beams (i.e., one or more beams) mapped to the subcell of the selected first terminal device to the first white list, thus ensuring its/their inclusion in the scheduling and the transmission. The access node adds, in block 605, any beams fulfilling the following three conditions to the first black list: the beams are 1) not mapped to the first subcell, 2) belong to the set of non-orthogonal beams defined (in block 602) for the preferred beam of the first terminal device and 3) are not included in the first white list. Finally, the access node adds, in block 606, each terminal device having a preferred beam which belongs to the first black list to the second black list of terminal devices. After this step, all the lists have been updated regarding the first terminal device. Thereafter, the access node checks, in block 607, whether there are in the cell still terminal devices whose preferred beams have not been added to the white list or which have not been added to the second black list, that is, terminal devices which are still selectable in block 603. If this is the case, the access node selects, in block 603, another terminal device as the first terminal device from the terminal devices which are still selectable, again based on the criteria of highest scheduling priority. It should be noted that this "second" first terminal device may be the terminal device within the cell with the second highest scheduling priority or it may be a terminal device with the third highest scheduling priority or even lower scheduling priority. This depends on the scheduling priorities of terminal devices sharing the same subcell with the highest scheduling priority terminal device as well as on which terminal devices (if any) were added to the second black list during the first iteration of the process. When it is determined in block 607 that all the terminal devices have been covered by the process (included in or excluded from the scheduling), the access node performs to the terminal devices included in the scheduling time- and frequency scheduling as was discussed in relation to FIG. 5.

FIGS. 7 to 10 are used to further illustrate the process described above with in FIGS. 5 and 6 in an exemplary scenario in which the access node providing the cell comprises one TD scheduler and four parallel FD schedulers. The access node 101 may correspond to the access node architecture as shown in FIG. 3 with n=4.

Figure 7:
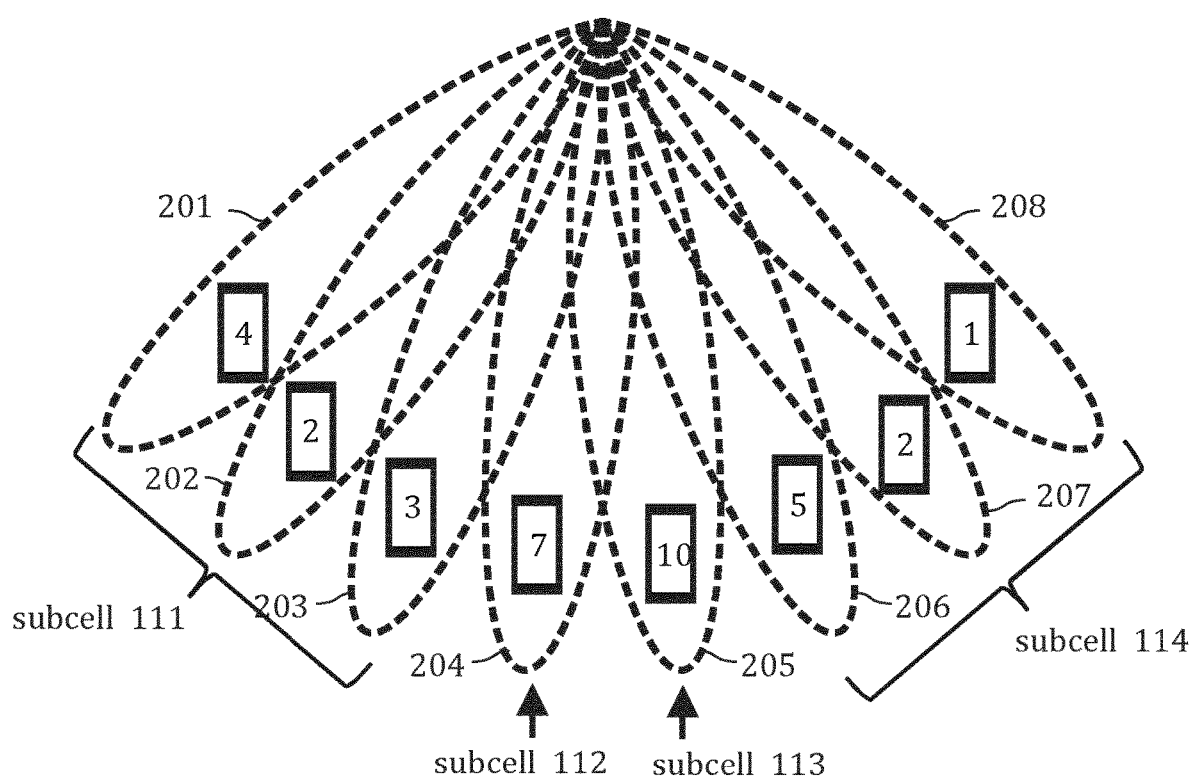
FIGS. 7 to 10 show examples of beams and terminal devices approved to be scheduled in different stages of beam selection.

FIG. 7 illustrates a result of steps corresponding to blocks 502 and 503 of FIG. 5. In FIG. 7, a number inside a terminal device, depicted by a rectangle within each beam 201, 202, 203, 204, 205, 206, 207, 208, depicts how many terminal devices report corresponding beam as their preferred beam. In this example, the beam 205 is the beam which the largest number of terminal devices report as their preferred beam, that is, the beam 205 has the largest load. Based on the preferred beams of the terminal devices, the total load of the cell is balanced among the subcells by assigning beams to subcells. In this example, the two beams 204, 205 with the highest loads are given their own subcells 112, 113 while the rest of the beams 201, 202, 203, 206, 207, 208 serve two subcells on two sides of the two single-beam subcells 112, 113.

Figure 8:
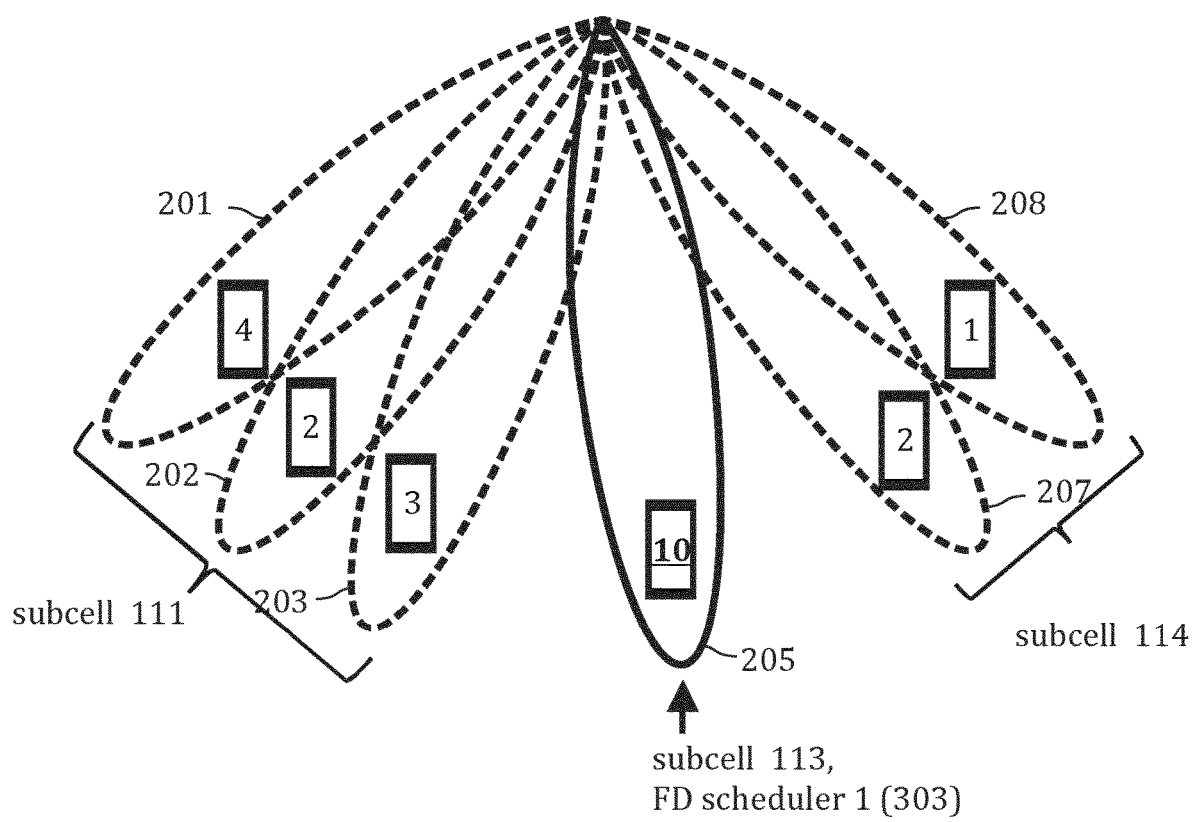

FIG. 8 illustrates a result of the first round of iterations according to the process of FIG. 7. In this example, the terminal device with the highest scheduling priority is found (block 603) in the subcell 113. Consequently, the beam 205

(being the only beam mapped to the subcell 113) is added to the first white list, that is, the subcell 113 is approved for scheduling. Specifically, the beam 205 and the terminal devices served by the beam 205 are assigned for the FD scheduler 1. Furthermore, the beams 204, 206 adjacent to the beam 205 are in this example non-orthogonal to the beam 205 and said beams as well as the terminal devices served by said beams are thus added (block 605) to the first black list and the second black list, respectively. In other words, said beams 204, 206 and terminal devices served by said beams are excluded from the scheduling.

Figure 9:
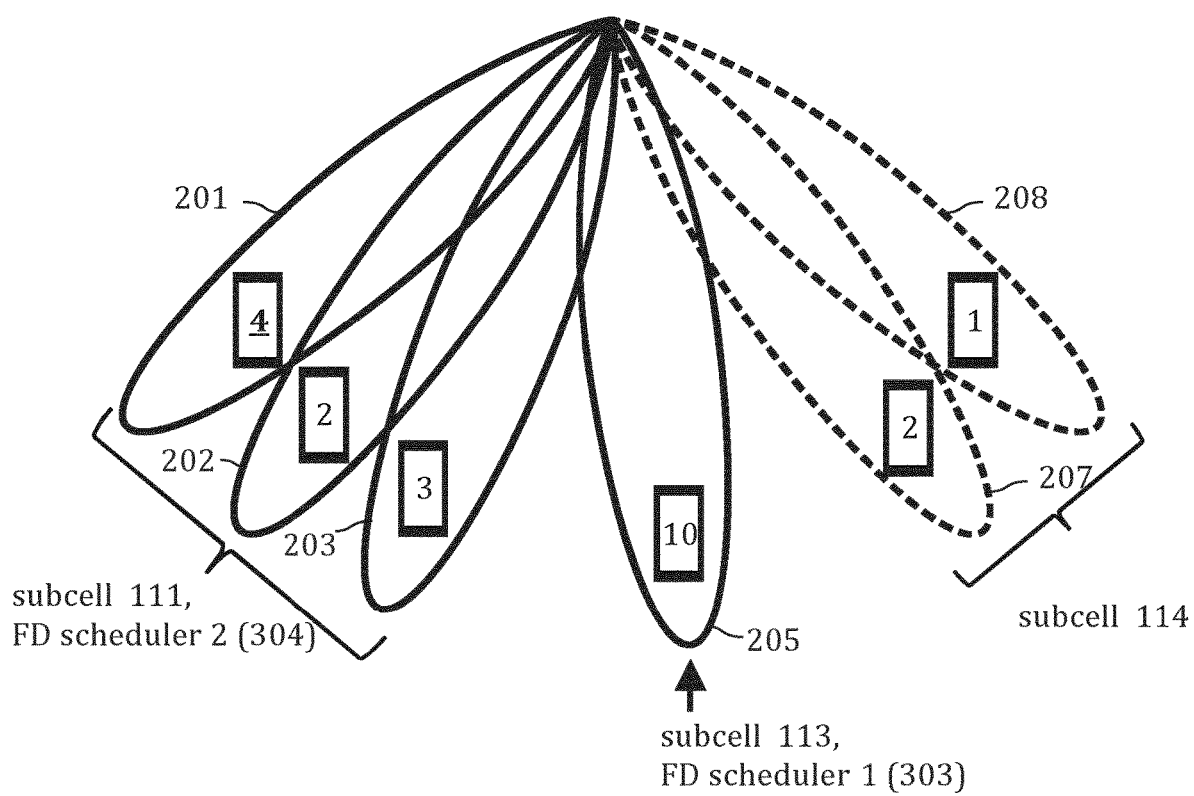

Obviously, at this point there are still terminal devices which may be selected (block 607). Therefore, at least one more iteration of the process is still needed. FIG. 9 illustrates a result of said second iteration. In this example, it is determined that the terminal device with the highest scheduling priority among the terminal devices still valid for this selection is served by beam 201 and is located in subcell 111. Consequently, all the beams 201, 202, 203 mapped to the subcell 111 are added to the first white list. Thus, the beams 201, 202, 203 and the terminal devices served by the beams 201, 202, 203 are assigned for FD scheduler 2. In this example, there are no non-orthogonal beams to the beams 201, 202, 203 corresponding to a different subcell so no beams or terminal devices are excluded.

Figure 10:
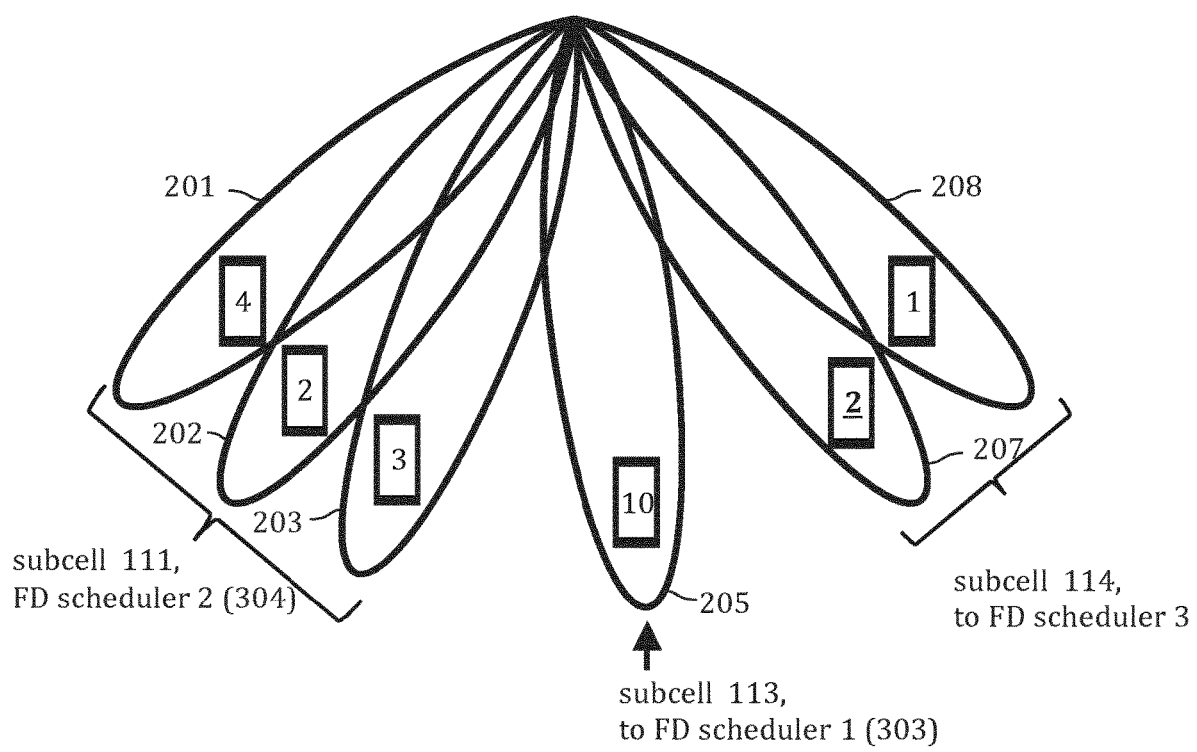

FIG. 10 illustrates a result of the third (and final) round of iterations in this example. At this point, only the three terminal devices in the subcell 114 are still selectable (block 603) as all the other terminal devices in the cell have been approved for scheduling (i.e., the corresponding beams have been added to the first white list) or added to the second black list. It is determined that a terminal device served by the beam 207 has the highest scheduling priority. Consequently, the beams 207, 208 (but not the previously excluded beam 206) corresponding to the subcell 114 are added to the first white list. Thus, the beams 207, 208 and the terminal devices served by the beams 207, 208 are assigned for FD scheduler 3. In this case, there are no non-orthogonal beams to the beams 207, 208 corresponding to a different subcell so no beams or terminal devices are excluded.

Figure 11:
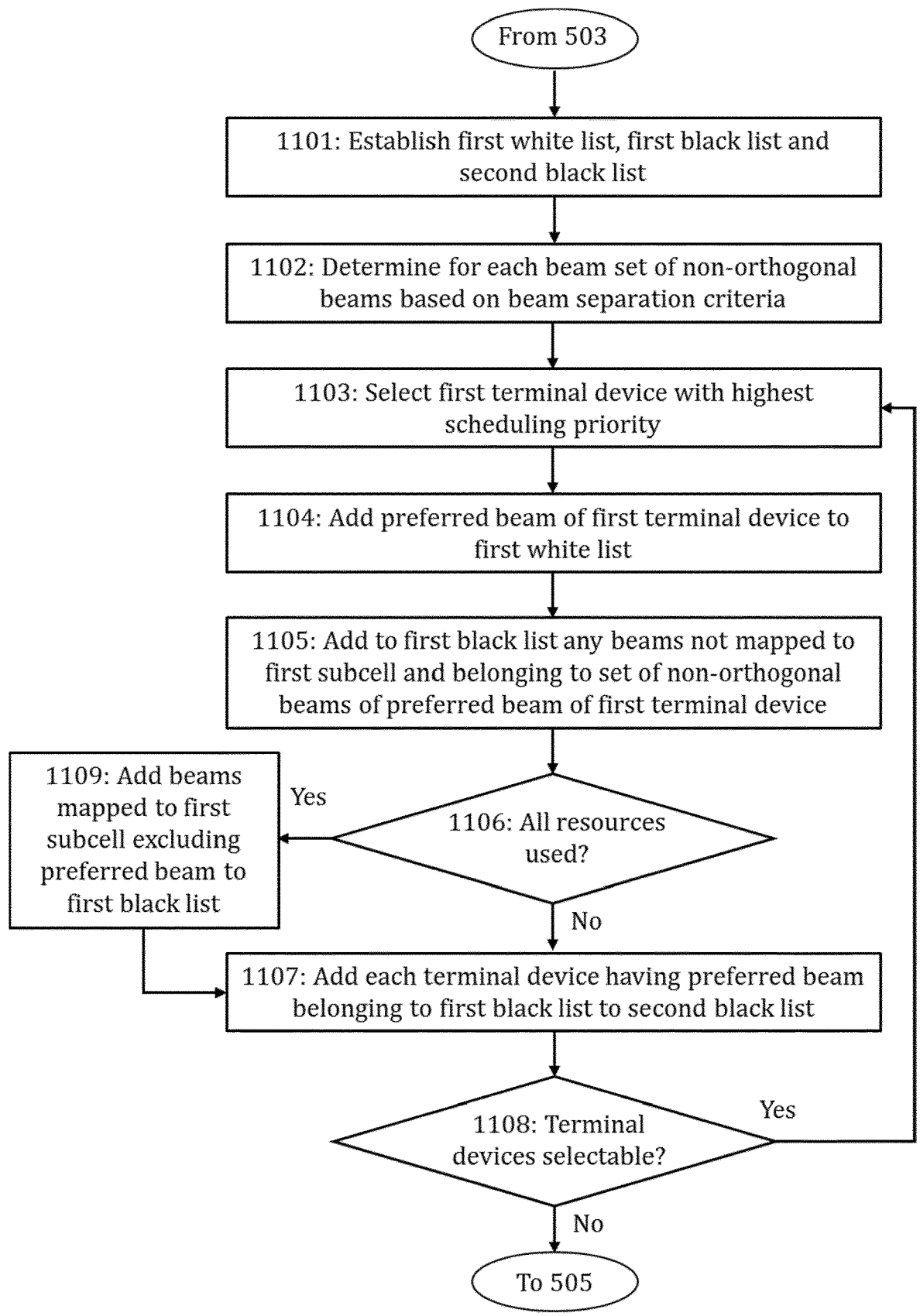
FIGS. 11 and 12 illustrate examples of processes.

The process illustrated in FIG. 6 as well as in FIGS. 7 to 10 using a specific exemplary scenario ensures that the beams are orthogonal at least for the terminal devices with the highest scheduling priority in each subcell. In other words, each terminal device selected in block 603 of FIG. 6 is ensured orthogonality. Orthogonality may be achieved also for the other active (scheduled) terminal devices, but it is not guaranteed by the process. FIG. 11 illustrates an alternative process where orthogonality is ensured for all the scheduled terminal devices. It should be noted that ensuring the orthogonality for all the scheduled terminal devices comes with the cost of having to exclude more terminal devices compared to the process of FIG. 6.

Referring to FIG. 11, the first three steps of the process (blocks 1101, 1102, 1103) corresponds to the block 601, 602, 603 of FIG. 6 and are therefore not repeated here for brevity. However, after the first terminal device with the highest scheduling priority is selected, in block 1103, the access node adds, in block 1104, only the preferred beam of the first terminal device to the first white list. Thereafter, the access node adds, in block 1105, any beams fulfilling the following three conditions, similar to FIG. 6, to the first black list: the beams are 1) not mapped to the first subcell, 2) belong to the set of non-orthogonal beams defined for the preferred beam of the first terminal device and 3) are not included in the first white list. The access node checks, in block 1106, whether the first terminal device is able to use all the frequency resource unit (e.g., PRBs) reserved for the first subcell of the first terminal device. If this is the case, the access node adds, in block 1109, all the beams of the first subcell excluding the preferred beam of the first terminal device to the first black list and only then proceeds to perform block 1107. If this is not the case, the method proceeds directly to block 1107. The final two steps (blocks 1107, 1108) correspond to blocks 606 and 607 of FIG. 6, respectively and are therefore not repeated here for brevity.

In some embodiments, the checking in block 1106 and consequently the adding in block 1109 may be omitted. It should be appreciated that said step are not necessary for achieving the orthogonality.

Figure 12:
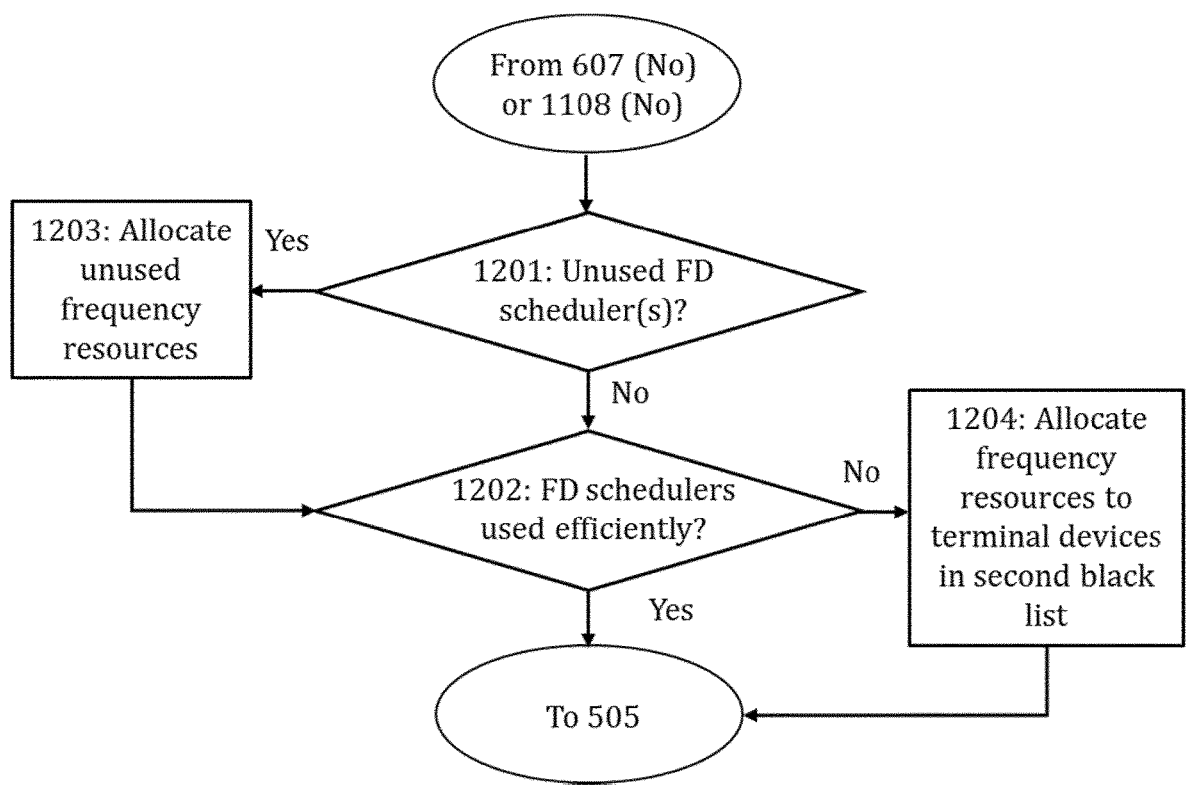

In the example illustrated in FIGS. 7 to 10, scheduling in frequency-domain was divided among three FD schedulers. However, in said example it was assumed that four parallel FD schedulers are available (i.e., one per subcell). Therefore, in the example scenario one of the FD schedulers becomes redundant. Obviously, the distribution of terminal devices and their scheduling priorities are constantly changing and in some other time instance it is possible to use all of the four FD schedulers at the same time using the process of FIG. 6. However, it would still be beneficial if the FD scheduling resources which are determined, for example, in the process of FIG. 6 or FIG. 11, to be redundant in the following period of scheduling (e.g., the following TTI) could be utilized to improve scheduling for the scheduled terminal devices. FIG. 12 illustrates a process for achieving such rescheduling to improve the utilization of the available frequency resources (i.e., FD schedulers). The process of FIG. 12 may be initiated after it is determined in block 607 or block 1108 that no terminal devices are selectable for another round of iteration according to FIG. 6 or FIG. 11.

Referring to FIG. 12, the process starts by the access node checking, in block 1201, whether all the parallel frequency resources (FD schedulers) are in use, that is, whether the first white list comprises for each subcell at least one beam mapped to the subcell. If one or more FD schedulers are unused (i.e., idle), the access node allocates, in block 1203, unused frequency resources of the one or more unused FD schedulers to the scheduled terminal devices. Specifically, the access node may perform in block 1203 one of two alternative operations. In the first alternative operation, the access node allows one of the other FD schedulers (i.e., one subcell associated with the first white list) to co-schedule two terminal devices instead of a single terminal device using the unused FD scheduler. The determination which FD scheduler should be allowed to co-schedule may be based on one or more of the following: scheduling priorities of terminal devices scheduled by each FD scheduler, amount of data in the buffer, load of each subcell (associated with at least one FD scheduler) and number of beams available in each subcell that are not in the first black list. This first alternative operation maximizes spectral efficiency by seeking to maximize the number of co-scheduled terminal devices. In the second alternative operation, the access node splits the workload of one or more heavily loaded FD schedulers (cores) across frequency domain to split parts of the workload and allocates one split part of the workload to the unused FD scheduler. In other words, the access node enables frequency-scheduling of additional frequency resources primarily reserved for the subcell corresponding to the unused FD scheduler to one or more subcells associated with the first white list. The access node may be configured to select one of the two alternative operations to be performed based on, e.g., loads of the FD schedulers and perform the selected alternative operation or the access node may be configured to perform only the first alternative operation or only the second alternative operation.

To provide an example of applying the process of FIG. 12, the exemplary scenario already discussed in FIGS. 7 to 10 may be considered. In said exemplary scenario, one of the subcells, namely the subcell 112, was wholly excluded from the scheduling. Therefore, the process illustrated in FIG. 12 may be applied in this case to utilize the resources reserved for the excluded subcell. Following the third round of iterations (result of which is shown in FIG. 10), the access node (or specifically the TD scheduler) may allow, in block 1203, one of the subcells to schedule two layers of terminal devices (that is, to co-schedule two terminal devices) so that the MU-MIMO gain may be fully realized. The TD scheduler may simply allow the sub-cell 113 having the highest load to co-schedule. However, the TD scheduler may also take into account in selecting the subcell (or equivalently the FD scheduler) for co-scheduling whether there are sufficient number of beams to allow orthogonality across the two layers of terminal devices in said subcell. In this sense, even though the subcell 113 has the highest load, because scheduling two layers within the same beam may likely result in very high interference, the TD scheduler may allow the subcell 111 to schedule two layers of terminal devices instead.

The aforementioned two alternative operations for allocation in block 1203 may be performed to take advantage of one or more unused FD schedulers. However, the frequency resource utilization described above with FIG. 12 may also be optimized for the active FD schedulers. For that purpose, the functionality in FIG. 12 may be amended as follows. To determine whether the resources are used efficiently, the access node determines, in block 1202, whether the frequency resources are utilized fully in the current frequency-scheduling. For example, the access node may simply check whether all the available frequency resources (e.g., PRBs) are in use or if at least a certain number or percentage of them is in use. If this is not the case, the access node removes, in block 1204, one or more terminal devices from the second black list of terminal devices and performs frequency-scheduling also for said one or more terminal devices. If it is determined in blocks 1201 and 1202 that there are no unused FD schedulers and/or frequency resource utilization for the FD schedulers is sufficiently high, the process simply skips the related functionalities (i.e., block 1203 and/or block 1204).

In some embodiments, block 1201 of FIG. 12 may be omitted so that the process starts, after the initiation in block 607 of FIG. 6 or block 1108 of FIG. 11, with block 1202. In other embodiments, block 1202 of FIG. 12 may be omitted so that the process proceeds directly from block 1201 or block 1203 to block 505 of FIG. 5.

The blocks, related functions, and information exchanges described above by means of FIGS. 4 to 12 are in no absolute chronological order, and some of them may be performed simultaneously or in an order differing from the given one. For example, the time-scheduling may be performed (block 402 of FIG. 4 or block 505 of FIG. 5) before or in parallel to selecting (block 401 of FIG. 4 or block 504 of FIG. 5) the active beams. Other functions can also be executed between the blocks and related functions or within them, and other information may be sent. For example, the access node may store any of the results produced by the blocks, related functions, and information exchanges described above by means of FIGS. 4 to 12 to a memory or a database. Some of the blocks or part of the blocks or one or more pieces of information can also be left out or replaced by a corresponding block or part of the block or one or more pieces of information.

Figure 13:
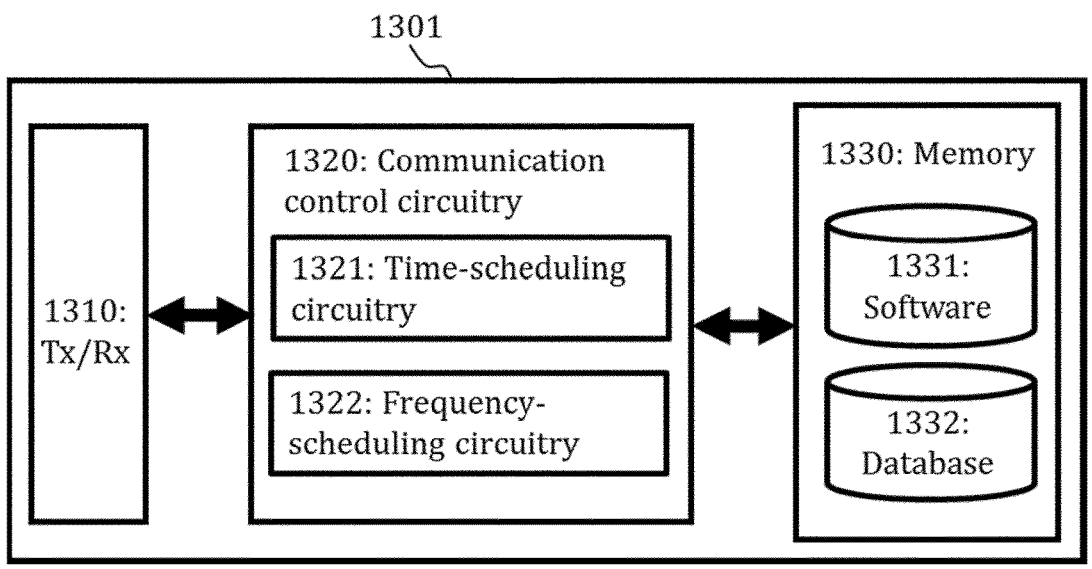
FIG. 13 illustrates an exemplary apparatus.

FIG. 13 illustrates an apparatus configured to carry out the functions described above in connection with the scheduling unit 301 of FIG. 3. Namely, the apparatus may be configured to perform one or more of the processes illustrated in FIGS. 4 to 12. The apparatus may be an electronic device comprising electronic circuitries. The apparatus may be a separate network entity or a plurality of separate entities. The apparatus may comprise a communication control circuitry 1320 such as at least one processor, and at least one memory 1330 including a computer program code (software) 1331 wherein the at least one memory and the computer program code (software) are configured, with the at least one processor, to cause the apparatus to carry out any one of the embodiments of the scheduling unit or the access node described above. In some embodiments, the at least one processor may at least comprise a processor configured to perform time-scheduling and two or more processors configured to perform frequency-scheduling in parallel. In other embodiments, the at least one processor may at least comprise a core (a circuitry) configured to perform time-scheduling and two or more cores (circuitries) configured to perform frequency-scheduling in parallel. Each core may correspond to the core of a single-core processor or to one of the cores of a multi-core processor.

The memory 1330 may be implemented using any suitable data storage technology, such as semiconductor based memory devices, flash memory, magnetic memory devices and systems, optical memory devices and systems, fixed memory and removable memory. The memory may comprise a database 1332 which may comprise, for example, terminal device measurement data, information on non-orthogonal beams, information on beam-to-subcell mappings, the first white list, the second white list and/or the first black list as described in previous embodiments. The memory 1330 may be connected to the communication control circuitry 1320 via an interface.

The apparatus may further comprise a communication interface (Tx/Rx) 1310 comprising hardware and/or software for realizing communication connectivity according to one or more communication protocols. The communication interface may provide the apparatus with communication capabilities to communicate in the cellular communication system and enable communication with other units of the access node, for example. The communication interface 1310 may comprise standard well-known components such as an amplifier, filter, frequency-converter, (de)modulator, and encoder/decoder circuitries and one or more antennas.

Referring to FIG. 13, the communication control circuitry 1320 may comprise at least time-scheduling circuitry 1321 configured for performing time-scheduling and determining which beams and terminal devices should be provided for the frequency-scheduling circuitry and frequency-scheduling circuitry 1322 configured for performing the frequency-scheduling based on the information from the time-scheduling circuitry 1321. The time-scheduling circuitry 1321 may be configured to carry out any of blocks 401, 402, 501 to 505, 601 to 607, 1101 to 1109 and 1201 to 1204 described above. The frequency-scheduling circuitry 1322 may be configured to carry out any of blocks 403 and 506 described above. Block 507 and 508 may be performed by either the time-scheduling circuitry 1321 or the frequency-scheduling circuitry 1322 or by another separate circuitry. In some embodiments, a third circuitry (not shown in FIG. 13) comprised in the communication control circuitry 1320 may be configured to perform the non-time-critical functions (e.g., blocks 401, 501 to 504, 601 to 607, 1101 to 1109 and/or 1201 to 1205) while the time-scheduling circuitry 1321 and the frequency-scheduling circuitry 1322 may be configured, in this case, to perform only the time-critical scheduling functions, that is, time/frequency-scheduling performed in blocks 402, 403, 505, 506, e.g., every TTI.

In an embodiment, the apparatus illustrated in FIG. 13 may be the access node 101 comprising the scheduling unit 301. In such a case, the previous description in relation to FIG. 13 applies as such. Moreover, the communication interface 1310 may comprise in this case one or more MIMO antenna arrays. Specifically, the communication interface 1310 may comprise at least a receiving MIMO antenna array 306 and a transmitting MIMO antenna array 307 as shown in FIG. 3.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 4 to 12 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 4 to 12 or operations thereof. In an embodiment, the processes described in connection with FIG. 4 may be carried out by an apparatus comprising corresponding means for carrying out the described processes. Specifically, the apparatus may comprise selection means for selecting a set of one or more active beams for each of at least two subcells comprised in the two or more subcells from beams produced by an antenna array of the access node, time-scheduling means for performing time-scheduling for the cell in common and frequency-scheduling means for performing frequency-scheduling separately and in parallel for each of the at least two subcells for transmission using a corresponding set of one or more active beams. Both the selection means and the time-scheduling means may be comprised in a time-domain scheduler of a scheduling unit. Alternatively, the selection means may comprise a separate subunit (circuitry) within a scheduling unit and the time-scheduling means may comprise a time-domain scheduler of the same scheduling unit. The frequency-scheduling means may comprise one or more parallel frequency-domain schedulers of a scheduling unit. Each time- and frequency-domain scheduler may comprise at least one processor having at least one core or at least one core of a single or multi-core processor.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 4 to 12 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method for performing in an access node time and frequency scheduling for a cell comprising a plurality of subcells and a plurality of terminal devices, the method comprising:
    selecting a set of one or more active beams for a subset of the plurality of subcells from beams produced by an antenna array of the access node, wherein the one or more active beams are spatially orthogonal;
    performing time-scheduling for the plurality of subcells in common; and
    performing, in parallel, frequency-scheduling separately for the subset of subcells for transmission using corresponding beams of the set of one or more active beams,
    wherein the access node is configured to use multi-user multiple-input multiple-output to communicate with the plurality of terminal devices simultaneously, and
    wherein the selecting the set of one or more active beams for the subset of subcells comprises:
    receiving radio channel measurements of the plurality of terminal devices within the cell;
    determining for a terminal device of the plurality of terminal devices within the cell a preferred beam from the beams based on the radio channel measurements, the preferred beam providing a best channel quality for the terminal device;
    mapping the beams produced by the antenna array to the plurality of subcells based on preferred beams of the terminal devices in different subcells and a load balancing scheme; and
    selecting the set of one or more active beams for the subset of subcells from mapped beams of a corresponding subcell such that the one or more active beams are spatially orthogonal at least for terminal devices with a highest scheduling priority in the corresponding subcell of the subset of subcells.

2. A method according to claim 1, further comprising:
    repeating the selecting, the performing the time-scheduling and the performing the frequency-scheduling periodically based on a first timer and the selecting, the performing the time-scheduling and the performing the frequency-scheduling periodically based on a second timer, wherein the first timer has a longer period than the second timer.

3. A method according to claim 1, wherein the selecting the set of one or more active beams comprises selecting sets of one or more active beams from a first white list generated by performing the following:
    1) establishing a first white list for sets of one or more active beams for the subset of subcells, a first black list of beams and a second black list of terminal devices;
    2) determining for a beam of the antenna array a set of non-orthogonal beams based on beam separation criteria in azimuth and/or elevation directions;
    3) selecting a first terminal device with the highest scheduling priority from the terminal devices excluding terminal devices having a preferred beam in the first white list and terminal devices in the second black list;
    4) adding a preferred beam of the first terminal device to the first white list;
    5) adding to the first black list any beams fulfilling following three conditions: the beams are not mapped to a first subcell, the beams belong to the set of non-orthogonal beams of the preferred beam of the first terminal device and the beams are not in the first white list;
    6) adding a terminal device having a preferred beam belonging to the first black list to the second black list of terminal devices; and
    7) repeating 3) to 6) until no terminal devices are selectable in 3).

4. A method according to claim 3, wherein the frequency-scheduling is performed only for terminal devices not in the second black list.

5. A method according to claim 3, further comprising:
    after the selecting the sets of one or more active beams by forming the first white list, in response to the first white list excluding all beams mapped for at least one subcell, enabling parallel frequency-scheduling of at least two terminal devices for at least one subcell associated with the first white list based on one or more of the following: scheduling priority, amount of data in buffer, subcell load and number of beams available in a subcell that are not in the first black list.

6. A method according to claim 3, further comprising:
    after selecting the sets of one or more active beams by forming the first white list, in response to all beams of at least one subcell being excluded from the first white list, enabling frequency-scheduling of additional frequency resources primarily reserved for the at least one subcell to one or more subcells associated with the first white list.

7. A method according to claim 3, further comprising:
    in response to detecting that a part of frequency resources available for the frequency-scheduling of at least one of the subset of subcells is left unused, removing one or more terminal devices of said at least one of the subset of subcells from the second black list of terminal devices and performing frequency-scheduling for the one or more terminal devices.

8. A method according to claim 3, wherein the beam separation criteria comprise a threshold value for one or more of the following: angular separation of beam directions in azimuth and/or elevation directions, angular separation of beam directions in azimuth and/or elevation directions taking into account beamwidths of the beams and amount of interference a beam causes to other beams in terms of beamforming gain.

9. A method according to claim 1, wherein the highest scheduling priority is evaluated based on a scheduling priority metric defined as one of the following: a proportional fairness metric, a guaranteed bit rate, a time-to-live and a head-of-line packet delay.

10. A method according to claim 1, wherein the load balancing scheme is based on balancing load metrics of the plurality of subcells, the load metrics being defined as one of the following: a number of terminal devices associated with beams in the subcell and a maximum proportional fairness metric of terminal devices in the subcell.

11. A method according to claim 1, wherein the mapped beams for a subcell are adjacent to a respective other in azimuth and/or elevation directions.

12. A method according to claim 1, wherein the time-scheduling is performed by a time-domain scheduler and the frequency-scheduling is performed by a plurality of parallel frequency-domain schedulers.

13. A method according to claim 12, wherein the number of the plurality of parallel frequency-domain schedulers is equal to the number of the plurality of subcells of the cell.

14. A method according to claim 1, wherein the access node is configured for multiple-input and multiple-output, MIMO, operation and the antenna array is a MIMO antenna array.

15. An apparatus comprising:
   at least one processor, and
   at least one memory comprising a computer program code, wherein the at least one processor, the memory, and the computer program code are configured to:
   select a set of one or more active beams for a subset of a plurality of subcells within a cell from beams produced by an antenna array of an access node, wherein the one or more active beams are spatially orthogonal;
   perform time-scheduling for the plurality of subcells in common; and
   perform, in parallel, frequency-scheduling separately for the subset of subcells for transmission using corresponding beams of the set of one or more active beams,
   wherein the access node is configured to use multi-user multiple-input multiple-output to communicate with a plurality of terminal devices within the cell simultaneously, and
   wherein in the selecting the set of one or more active beams for the subset of subcells the at least one processor, the memory, and the computer program code are configured to:
   receive radio channel measurements of the plurality of terminal devices within the cell;
   determine for a terminal device of the plurality of terminal devices within the cell a preferred beam from the beams based on the radio channel measurements, the preferred beam providing a best channel quality for the terminal device;
   map the beams produced by the antenna array to the plurality of subcells based on preferred beams of the terminal devices in different subcells and a load balancing scheme; and
   select the set of one or more active beams for the subset of subcells from mapped beams of a corresponding subcell such that the one or more active beams are spatially orthogonal at least for terminal devices with a highest scheduling priority in the corresponding subcell of the subset of subcells.

16. An apparatus according to claim 15, wherein the at least one processor, the memory, and the computer program code are further configured to:
   repeat the selecting, the performing the time-scheduling and the performing the frequency-scheduling periodically based on a first timer and the selecting, the performing the time-scheduling and the performing the frequency-scheduling periodically based on a second timer, wherein the first timer has a longer period than the second timer.

17. An apparatus according to claim 15, wherein the at least one processor comprises a processor configured to perform time-scheduling and two or more processors configured to perform frequency-scheduling in parallel.

18. A non-transitory computer readable medium having stored thereon instructions that, when executed by a computing device, cause the computing device to perform at least the following:
   selecting a set of one or more active beams for a subset of a plurality of subcells from beams produced by an antenna array of an access node, wherein the one or more active beams are spatially orthogonal;
   performing time-scheduling for the plurality of subcells in common; and
   performing, in parallel, frequency-scheduling separately for the subset of subcells for transmission using corresponding beams of the set of one or more active beams,
   wherein the access node is configured to use multi-user multiple-input multiple-output to communicate with a plurality of terminal devices simultaneously, and
   wherein the instructions that cause the computing device to select the set of one or more active beams for the subset of subcells comprise instructions that, when executed by the computing device, cause the computing device to perform at least the following:
   receiving radio channel measurements of the plurality of terminal devices within a cell;
   determining for a terminal device of the plurality of terminal devices within the cell a preferred beam from the beams based on the radio channel measurements, the preferred beam providing a best channel quality for the terminal device;
   mapping the beams produced by the antenna array to the plurality of subcells based on preferred beams of the terminal devices in different subcells and a load balancing scheme; and
   selecting the set of one or more active beams for the subset of subcells from mapped beams of a corresponding subcell such that the one or more active beams are spatially orthogonal at least for terminal devices with a highest scheduling priority in the corresponding subcell of the subset of subcells.

* * * * *